(12) United States Patent
Engelhardt

(10) Patent No.: US 6,888,118 B2
(45) Date of Patent: May 3, 2005

(54) METHOD, APPARATUS AND SCANNING MICROSCOPE WITH MEANS FOR STABILIZING THE TEMPERATURE OF OPTICAL COMPONENTS

(75) Inventor: Johann Engelhardt, Bad Schoenborn (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 285 days.

(21) Appl. No.: 09/878,842

(22) Filed: Jun. 11, 2001

(65) Prior Publication Data

US 2002/0000507 A1 Jan. 3, 2002

(30) Foreign Application Priority Data

Jun. 19, 2000 (DE) .......................................... 100 29 167

(51) Int. Cl.[7] .................................................. G02B 7/04
(52) U.S. Cl. .................................... 250/201.3; 250/234
(58) Field of Search ............................. 250/201.3, 234, 250/216, 227.18, 227.23, 227.26, 226, 238, 306, 307; 362/257, 259

(56) References Cited

U.S. PATENT DOCUMENTS 5,742,425 A 4/1998 Kump et al. ................. 359/285
6,167,173 A * 12/2000 Schoeppe et al. ........... 250/234

FOREIGN PATENT DOCUMENTS

DE 198 27 140 12/1999
JP 2000047117 A * 2/2000 ........... G02B/21/00

* cited by examiner

Primary Examiner—Kevin Pyo
(74) Attorney, Agent, or Firm—Simpson & Simpson, PLLC

(57) ABSTRACT

The present invention concerns a method and an apparatus for stabilizing the temperature of optical, in particular optically active, electrooptical, or acoustooptical components, preferably in scanning microscopy, in particular in confocal scanning microscopy, such that the temperature of the component can be held in stable fashion at a constant value in a space-saving manner, as simply as possible, and with as few additional assemblies as possible, and is characterized in that the energy that interacts with the component serves for stabilization.

24 Claims, 1 Drawing Sheet

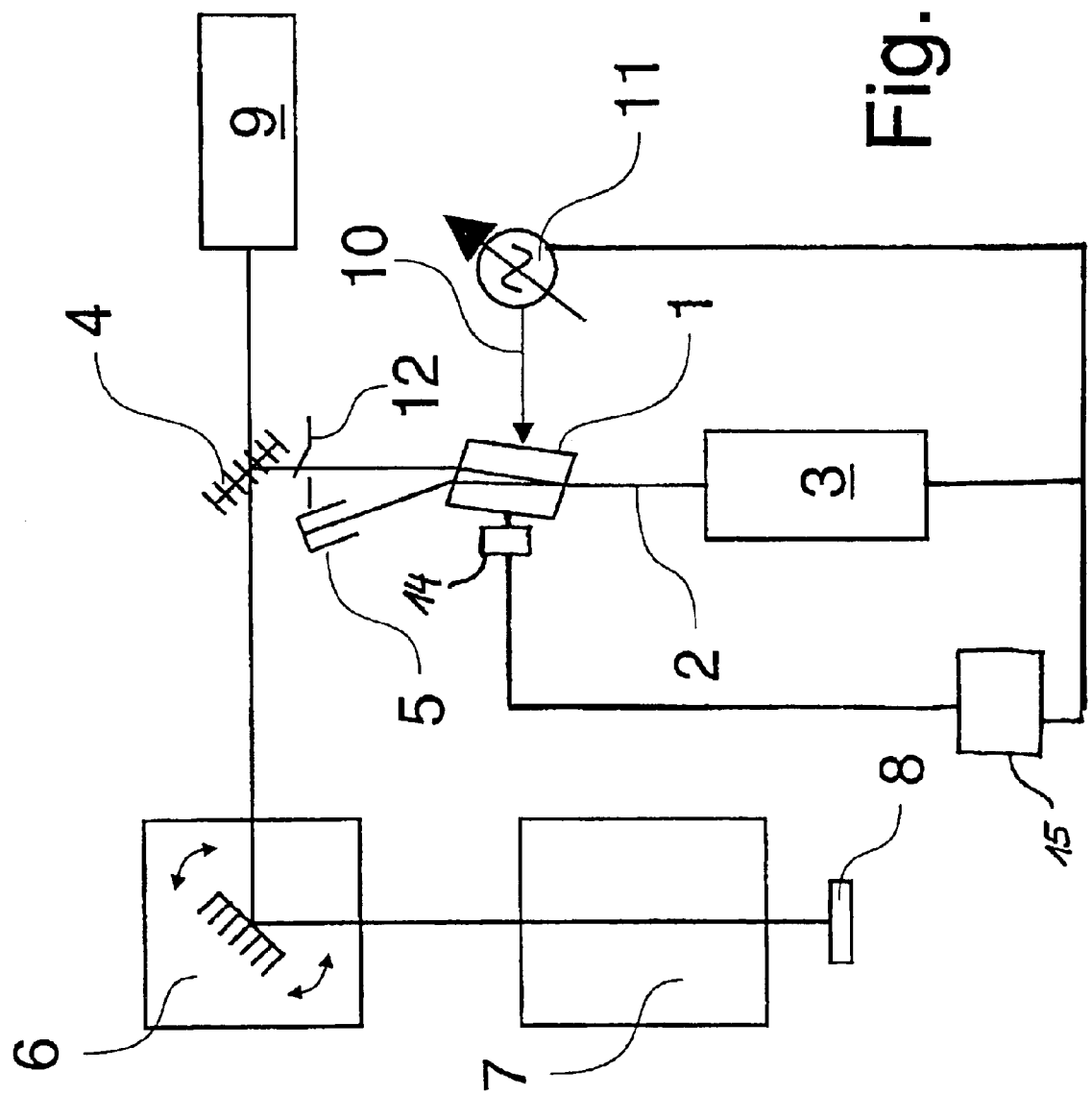

METHOD, APPARATUS AND SCANNING MICROSCOPE WITH MEANS FOR STABILIZING THE TEMPERATURE OF OPTICAL COMPONENTS

CROSS REFERENCE TO RELATED APPLICATIONS

This invention claims priority of the German patent application DE 100 29 167.8 filed Jun. 19, 2000 which is incorporated by reference herein.

FIELD OF THE INVENTION

The present invention concerns a method and an apparatus for stabilizing the temperature of optical, in particular optically active, electrooptical, or acoustooptical components, preferably in scanning microscopy, in particular in confocal scanning microscopy.

BACKGROUND OF THE INVENTION

To make possible a stable beam path whose optical properties are to be largely independent of temperature changes, temperature regulation or corresponding corrections are necessary in particular when optically active components are used, for example in the case of acoustooptical tunable filters (AOTFs). AOTFs can be used for wavelength-selective coupling of light from multi-wavelength lasers into an optical assemblage, for example a confocal scanning microscope. In this context, the light is refracted at the sound waves passing through the AOTF. The drive power levels of the ultrasonic waves are approximately 1 W; the energy of the mechanical sound waves is ultimately converted into thermal energy, which results in heating of the optical component. In addition, the component is further heated by absorption of the light rays passing through the component. Usually, in the event of an interruption of the light that is to be coupled into a confocal scanning microscope, the drive energy or sound waves of the AOTF are switched off and the light that is to be coupled in is completely interrupted, for example with a shutter preceding the AOTF. If the interruption lasts a long time, the optical component has a different optical property due to the temperature change, thus disadvantageously influencing principally the efficiency with which light is coupled in.

Methods and apparatuses of the generic type are known from practical use. The reader is referred, purely by way of example, to DE 198 27 140 A1, which discloses a laser scanning microscope having an AOTF. The AOTF known from this apparatus has in its vicinity a temperature sensor and/or a heating system or cooling system. Either the AOTF is regulated to a constant temperature with the aid of the heating system or cooling system, the temperature sensor serving as a signal generator for a corresponding control loop; or alternatively, the instantaneous temperature of the AOTF is measured, and on the basis of previously stored correction curves, the AOTF frequency is adjusted and optimized in a predefined frequency window as a function of the temperature.

The approach known from the existing art requires a temperature sensor directly on the optical component or at least in its immediate vicinity, and the temperature sensor must have sufficient temperature accuracy. The use of a heating system or cooling system moreover requires additional space in terms of design, which is not always available especially in complex optical assemblages.

SUMMARY OF THE INVENTION

It is therefore the object of the present invention to describe a method for stabilizing the temperature of optical, in particular optically active, electrooptical, or acoustooptical components, with which the temperature of the component can be held in stable fashion at a constant value in a space-saving manner, as simply as possible, and with as few additional assemblies as possible.

The object is achieved by a method for stabilizing the temperature of optically active components, comprising the steps of:
determining the input power of the energy interacting with the optically active component for deflecting a light beam, and
switching to a non-deflecting energy interacting with the optically active component and thereby maintaining the average input power at a constant level.

It is therefore a further object of the present invention to describe and an apparatus which has the ability to maintain the temperature of the optically active component at a constant and using as few additional assemblies as possible.

The object is accomplished by an apparatus for stabilizing the temperature of an optically active component which comprises:
means for determining the input power of the energy interacting with the optically active component, and
means for switching to a non-deflecting energy interacting with the optically active component and thereby maintaining the average input power at a constant level.

An other object of the present invention is to provide a scanning microscope with which the temperature of a optically active component can be held in stable fashion at a constant value in a space-saving manner, as simply as possible, and with as few additional assemblies as possible and thereby providing stable optical properties over time.

The object is achieved by a scanning microscope, comprising:
a light source defining a light beam,
a dichroic beam splitter for directing the light beam to a scanning device and via a optical system to a specimen
an optically active component being arranged in the path of the light beam,
means for determining the input power of the energy interacting with the optically active component, and
means for switching to a non-deflecting energy interacting with the optically active component and thereby maintaining the average input power at a constant level.

What has been recognized according to the present invention is firstly that in the example of the optically active component, a longer interruption in the drive energy brings about a change in the temperature of the component. Interruption of the light that interacts with the component also results in a change in the temperature of the component, since no further absorption of light (which is otherwise converted into heat) then takes place in the component.

According to the present invention, stabilization of the temperature of an optical component is achieved by the fact that the energy that interacts with the component is also used for stabilizing its temperature. If the energy that interacts with the component acts in substantially uninterrupted fashion on the component, the latter has an approximately constant temperature. It is consequently possible, in advantageous fashion, to dispense with the use of the heating and/or cooling elements, which considerably simplifies the optical arrangement or a confocal scanning microscope. In particularly advantageous fashion, it is possible to dispense with a temperature sensor, since an approximately constant operating temperature for the component is ensured solely by the method according to the present invention.

In particularly simple fashion, stabilization of the temperature of optical components can be achieved if the energy that interacts with the component is kept at least largely constant. Even a short interruption in the energy that interacts with the component, with a duration of up to one second, would not bring about any substantial change in the temperature of the optical component. As soon as the confocal scanning microscope is not performing any imaging for a duration longer than one second, however, according to the present invention the optical component is impinged upon by an interaction energy (in whatever form).

In a preferred embodiment, the energy that interacts with the component is varied. The temperature of the component is thereby regulated, the energy that interacts with the component serving as the manipulated variable of a control loop. A detector of the actual state (the actual temperature of the optical component), which is necessary for the control loop, could be implemented with a temperature sensor. The latter would need, in the interest of the most accurate possible determination of the temperature of the optical component, to be mounted directly on it. Alternatively, a measurement of the temperature of the optical component could be accomplished by way of its optical properties, suitable calibration measurements previously being provided for the purpose. Such calibration measurements could be, for example, a measurement of the position of a light beam deflected by the optical component, if the deflections of the light beam depends on the temperature of the optical component. For this purpose, for example, an optically active component could be impinged upon by a well-defined drive energy, in which context the beam deflection of a light beam by the optical component as a function of its temperature is known on the basis of previous recordings of calibration curves. The deflection of the light beam could be accomplished, for example, with the aid of an LCD line suitably positioned in the deflected beam path of the light beam. A temperature control loop could advantageously yield a quick reaction or control action in response to temperature changes.

If the optical component is an acoustooptical component, the energy that interacts with the component is the drive energy of the acoustooptical component. Since the drive energy of the acoustooptical component is needed in any case for its correct operation, it is particularly advantageous that no further component or further assembly is necessary for stabilizing the temperature of the acoustooptical component. Analogously, the energy that interacts with an electrooptical component is electrical energy.

In the context of the apparatus according to the present invention, the component could be a dichroic beam splitter, acoustooptical tunable filter (AOTF), acoustooptical beam splitter (AOBS), acoustooptical modulator (AOM), acoustooptical deflector (AOD), or electrooptical modulator (EOM). If several of these optical components are used simultaneously in an optical assemblage, what has been stated so far applies to temperature stabilization for each of these components.

In particularly preferred fashion, light of at least one wavelength is coupled into and/or out of an optical assemblage with the aid of the component. AOTFs and AOBSs are used, in particular, for this purpose. The component could furthermore modify the intensity of the light that is coupled in and/or out. A deflection of the light beam of an optical assemblage with the aid of the component is also conceivable.

In particularly advantageous fashion, the component is adjustable in such a way that the influencing of the light is thereby effective selectively on light of at least one wavelength and/or on light in at least one polarization state. For example, light from a multi-wavelength laser can thereby be selectively coupled into and/or out of an optical assemblage, and its intensity can be varied. A selective deflection is also conceivable.

The influencing of the light by the optical component can be synchronized with a measurement operation and/or illumination operation. As a result, for example, light can be coupled into a confocal scanning microscope only when a specimen detection is being performed.

For stabilizing the temperature of the optical component, provision is made for the component to be impinged upon by the interaction energy even when no measurement operation and/or illumination operation is being accomplished. In particularly advantageous fashion, however, the form of the interaction energy is then selected in such a way that the light passing through the module is not influenced because of the interaction energy. In this case, therefore, the energy that interacts with the component then serves only to stabilize its temperature.

In a particularly preferred concrete embodiment, light of at least one wavelength is coupled into a confocal scanning microscope with the aid of an AOBS or an AOTF. For this purpose, in order to couple in light of a specific wavelength, the AOBS or AOTF is impinged upon by a frequency of the drive energy that corresponds to the wavelength that is to be coupled in. Very generally in an AOBS or AOTF, light of a specific wavelength is refracted at a mechanical wave passing through the crystal of the AOBS or AOTF; or, as a result of the mechanical wave of a specific frequency passing through the crystal, the Bragg condition is created for light of a wavelength that corresponds to the frequency of the mechanical wave. The lattice constant on which this light influence is based is dependent on the frequency of the mechanical wave passing through the crystal, and together with the wavelength of the light constitutes the Bragg condition for influencing the light.

In the instance in which no light is being coupled into the confocal scanning microscope, for example during a measurement pause, for stabilization of the temperature of the AOBS or AOTF the latter is nevertheless impinged upon by a frequency of the drive energy that, however, does not correspond to any of the available light wavelengths. The light is not influenced by the AOBS or AOTF because of the latter's drive energy, but the temperature of the AOBS or AOTF is nevertheless held constant.

In particular during confocal scanning microscope scanning pauses, the AOBS or AOTF is impinged upon by a frequency of the drive energy that corresponds to none of the light wavelengths being used. In this connection, "confocal scanning microscope scanning pauses" are to be understood in particular as the reversal points of the scanning operation in the X or Y direction.

The light that is not coupled into the confocal scanning microscope is absorbed with the aid of a beam trap arranged at a suitable position.

Since, according to the present invention, the AOTF or AOBS is continuously being impinged upon by light and/or interaction energy, provision is made, principally for reasons of laser safety, for an additional interruption of the light beam with a beam interruption system arranged after the component. This beam interruption system could be embodied, for example, in the form of a shutter.

BRIEF DESCRIPTION OF THE DRAWINGS

There are various ways of advantageously embodying and developing the teaching of the present invention. In conjunction with the explanation of the preferred exemplary embodiment of the invention with reference to the drawings, an explanation is also given of generally preferred embodiments and developments of the teaching. In the drawings, the single FIGURE shows a schematic depiction of a confocal scanning microscope for carrying out the method according to the present invention.

DETAILED DESCRIPTION OF THE INVENTION

The FIGURE shows a confocal scanning microscope, depicted merely schematically, that has an optically active component 1. Optically active component 1 deflects a portion of light beam 2 of light source 3 onto a dichroic beam splitter 4. Light that is not deflected by active optical component 1 toward dichroic beam splitter 4 is absorbed by beam trap 5. The light reflected from dichroic beam splitter 4 is deflected with the aid of scanning device 6 and is sent via microscope optical system 7 to specimen 8. The light returning from specimen 8 passes in the opposite direction through microscope optical system 7 and scanning device 6, and passes through dichroic beam splitter 4 toward detector 9. The FIGURE also illustrates that the present invention may be provided with temperature sensor 14 and control element 15 proximate the optically active component, if desired. Control element 15 accepts a reading of the temperature sensor and drives light source 3 and/or the frequency of drive unit 11 accordingly.

According to the present invention, energy 10 that interacts with optical component 1 serves to stabilize its temperature. In the context of the description, energy 10, has to be understood as a mechanical sound wave or as a ultrasonic wave. Interaction energy 10 is made available by drive unit 11 driven with an electromagnetic wave. The interaction energy being kept at least largely constant. The energy that interacts with optical component 1 (which is embodied as an AOTF) is thus the drive energy of the AOTF. The light energy of light beam 2 that interacts with optical component 1 is also used for temperature stabilization.

Light source 3 emits laser light of several wavelengths, and is in this context an argon-krypton laser that emits the 488 nm, 568 nm, and 647 nm wavelengths. By suitable activation of the AOTF, light of at least one wavelength can be coupled into the confocal scanning microscope. The intensity of the coupled-in light can be modified by modifying the amplitude of interaction energy 10. The AOTF is simultaneously impinged upon by sound waves of different frequencies, in such a way that light of different wavelengths of argon-krypton laser 3 can be selectively coupled in.

The coupling-in of the light can be synchronized with the illumination operation or detection operation of the confocal scanning microscope. Synchronization is accomplished in this context by the control device (not depicted) of the confocal scanning microscope, which appropriately controls drive unit 11 of AOTF 1. AOTF 1 is impinged upon by interaction energy 10 even when no illumination operation or detection operation is being performed. In this case light 2 passing through AOTF 1 is not influenced, i.e. it is absorbed by beam trap 5.

In order to couple in light 2 of one of the three wavelengths of argon-krypton laser 3, AOTF 1 must therefore be impinged upon by a frequency of the drive energy that corresponds to the wavelength that is to be coupled in. The drive energy of the corresponding frequency is output by drive unit 11.

If no light is being coupled into the confocal scanning microscope, AOTF 1 is impinged upon by a frequency of the drive energy which does not correspond to any of the available light wavelengths of argon-krypton laser 3. During confocal scanning microscope scanning pauses, the AOTF also is impinged upon by a frequency of the drive energy that does not correspond to any of the wavelengths of light source 3 that are used. The "scanning pauses" are the reversal points in the X or Y direction, and interruptions in the illumination operation or detection operation.

The light that is not coupled in is absorbed by beam trap 5.

Light beam 2 of light source 3 is directed onto AOTF 1 during the entire operating time of the confocal scanning microscope, i.e. even during its scanning pauses. As a result, the AOTF is also constantly impinged upon by light energy, so that the temperature of AOTF 1 is kept constant in this way as well. An additional capability for interrupting light beam 2 is achieved with a shutter 12 arranged after AOTF 1, which is provided in particular for purposes of laser safety.

In conclusion, be it noted very particularly that the exemplary embodiment discussed above serves merely to describe the teaching claimed, but does not limit it to the exemplary embodiment.

What is claimed is:

1. A method for stabilizing the temperature of at least one optically active component, comprising the steps of:
   impinging an optically active component with an interacting energy comprising a drive energy and light beam;
   determining the temperature of said optically active component by means of a temperature control loop comprising a temperature sensor;
   determining said interacting energy impinging said optically active component based on said temperature;
   applying a different interacting energy impinging to said optically active component, according to said temperature control loop, such that the temperature of said optically active component is maintained at a constant level.

2. The method as defined in claim 1, characterized in that the measurement of the temperature of the optically active component is accomplished by way of the optical properties of said optically active component, said properties of said optically active component calibrated prior to temperature measurement.

3. An apparatus for stabilizing the temperature of an optically active component comprises:
   a temperature control loop;
   a temperature sensor secured to said optically active component for measuring the temperature of said optically active component;
   means for determining an interacting energy interacting with the optically active component, wherein the interacting energy is a drive energy of the optically active component and a light beam that interacts with the optically active component; and,
   means for applying a different interacting energy to said optically active component, according to said temperature control loop, such that the temperature of said optically active component is maintained at a constant level.

4. The apparatus as defined in claim 3, characterized in that the optically active component comprises a dichroic beam splitter, an acoustooptical tunable filter (AOTF) and acoustooptical beam splitter (AOBS), an acoustooptical modulator (AOM), an acoustooptical deflector (AOD) or an electrooptical modulator (EOM).

5. The apparatus as defined in claim 4, characterized in that the optically active component provides one wavelength of a light beam for further use.

6. The apparatus as defined in claim 4, characterized in that the optically active component modifies the intensity of a light beam.

7. The apparatus as defined in claim 3, characterized in that a beam interruption is arranged after the optically active component.

8. A scanning microscope, comprising:
   a light source defining a light beam,
   a dicbroic beam splitter for directing the light beam to a scanning device and via a optical system to a specimen,
   an optically active component being arranged in the path of the light beam,
   a temperature control loop,
   a temperature sensor secured to said optically active component for measuring the temperature of the optically active component; wherein the temperature control loop and temperature sensor determine the temperature and an interacting energy for the optically active component; and,
   means for applying a different interacting energy, according to the determination of the temperature control loop, to the optically active component such that the temperature of the optically active component is maintained at a constant level.

9. The scanning microscope as defined in claim 8, characterized in that the optically active component consists essentially of an acoustooptical tunable filter (AOTF), an acoustooptical beam splitter (AOBS), an acoustooptical modulator (AOM), an acoustooptical deflector (AOD), or an electrooptical modulator (EOM).

10. The scanning microscope as defined in claim 9, characterized in that the optically active component provides one wavelength to be coupled into or out of the scanning microscope.

11. The scanning microscope as defined in claim 9, characterized in that the optically active component modifies the intensity of the light beam to be coupled into or out of the scanning microscope.

12. The scanning microscope as defined in claim 9, characterized in that the optically active component deflects at least one light beam.

13. The scanning microscope as defined in claim 9, characterized in that the optically active component is adjustable so that influencing of the light beam is thereby effective selectively on light of at least one wavelength and/or on light in at least one polarization state.

14. The scanning microscope as defined in claim 9, characterized in that influencing of the light beam is synchronized with a measurement operation and/or illumination operation of the scanning microscope.

15. The scanning microscope as defined in claim 14, characterized in that the optically active component is impinged upon by the interaction energy even when no measurement operation and/or illumination operation is being accomplished with the scanning microscope.

16. The apparatus as defined in claim 15, characterized in that in order to couple in a specific wavelength of the light beam, an acoustooptical beam splitter (AOBS) or acoustooptical tunable filter (AOTF) is impinged upon by a frequency of the drive energy that corresponds to the wavelength that is to be coupled in.

17. The apparatus as defined in claim 15, characterized in that if no light is being coupled in, an acoustooptical beam splitter (AOBS) or acoustooptical tunable filter (AOTF) is nevertheless impinged upon by a frequency of the drive energy that does not correspond to any of the available light wavelengths.

18. The apparatus as defined in claim 15, characterized in that the acoustooptical beam splitter (AOBS) or acoustooptical tunable filter (AOTF) is impinged upon by a frequency of the drive energy that corresponds to none of the light wavelengths being used for scanning with the scanning microscope.

19. The apparatus as defined in claim 15, characterized in that the light that is not coupled into the scanning microscope is absorbed with the aid of a beam trap.

20. The apparatus as defined in claim 8, characterized in that a beam interruption system is arranged after the optically active element.

21. The apparatus as defined in claim 20, characterized in that said beam interruption system comprises a shutter.

22. The apparatus as defined in claim 8 characterized in that said control loop comprises a temperature sensor secured to said optically active component.

23. The apparatus as defined in claim 7 wherein said beam interruption system comprises a shutter.

24. The method as defined in claim 1, characterized by switching the drive energy to a non-deflecting energy interacting with the optically active component during a measurement pause of the light beam used therefore.

* * * * *